United States Patent
McDaniel

(10) Patent No.: US 7,426,579 B2
(45) Date of Patent: Sep. 16, 2008

(54) SYSTEM AND METHOD FOR HANDLING FRAMES IN MULTIPLE STACK ENVIRONMENTS

(75) Inventor: Scott S. McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 751 days.

(21) Appl. No.: 10/302,474

(22) Filed: Nov. 21, 2002

(65) Prior Publication Data

US 2004/0054814 A1    Mar. 18, 2004

Related U.S. Application Data

(60) Provisional application No. 60/411,294, filed on Sep. 17, 2002.

(51) Int. Cl.
*G06F 15/16* (2006.01)
(52) U.S. Cl. ...................................................... 709/250
(58) Field of Classification Search ................... 709/250
See application file for complete search history.

(56) References Cited

U.S. PATENT DOCUMENTS

| | | | | |
|---|---|---|---|---|
| 5,410,696 A | * | 4/1995 | Seki et al. ............... | 717/149 |
| 6,141,705 A | * | 10/2000 | Anand et al. .............. | 710/15 |
| 6,434,620 B1 | * | 8/2002 | Boucher et al. ............ | 709/250 |
| 6,714,778 B2 | * | 3/2004 | Nykanen et al. .......... | 455/414.1 |
| 2002/0027880 A1 | * | 3/2002 | Mesiwala .................. | 370/252 |
| 2003/0204634 A1 | * | 10/2003 | Pinkerton et al. ........... | 709/250 |

OTHER PUBLICATIONS

Yeh et al., "Introduction to TCP/IP Offload Engine (TOE)", Apr. 2002, Version 1.0, pp. 1-6.*

* cited by examiner

*Primary Examiner*—John Follansbee
*Assistant Examiner*—Hassan Phillips
(74) *Attorney, Agent, or Firm*—McAndrews, Held & Malloy, Ltd.

(57) ABSTRACT

Systems and methods that handle frames in multiple stack environments are provided. In one embodiment, a system may include, for example, a non-offload protocol stack and an offload protocol stack, the offload protocol stack being coupled to the non-offload protocol stack. The non-offload protocol stack may include, for example, one or more partially processed frames. The one or more partially processed frames may be sent to the offload protocol stack to complete processing in the offload protocol stack.

42 Claims, 8 Drawing Sheets

SYSTEM AND METHOD FOR HANDLING FRAMES IN MULTIPLE STACK ENVIRONMENTS

RELATED APPLICATION

This application makes reference to, claims priority to and claims benefit from U.S. Provisional Patent Application Ser. No. 60/411,294, entitled "System and Method for Handling Partially Processed Frames" and filed on Sep. 17, 2002.

INCORPORATION BY REFERENCE

The above-referenced United States patent application is hereby incorporated herein by reference in its entirety.

BACKGROUND OF THE INVENTION

During an offload, network processing is transferred from a host-based software implementation to an offload engine coupled to a host with a direct memory interface. After a successful offload, the functions related, for example, to processing incoming frames that were performed by the host are then performed by the offload engine, thereby typically freeing up host resources (e.g., host processor resources).

An offload can be created according to a number of methods. In a first method, the offload engine can handle the entire life of the protocol connection. Thus, all connections of the type supported by the offload have to be routed to and processed by the offload device. However, since offload engines tend to have relatively limited resources as compared with the host, offload engines tend to be limited in the number of connections that can be supported. In a second method, the offload engine can offload a connection after it has been established. The second method can be the more flexible method.

During any offload process of an active packet-based network protocol, a period of time exists, for example, between the time in which the host protocol processing indicates an offload event to the offload engine and the time the offload engine continues processing on a connection. During the period of time, one or more packets may still reside in the non-offload stack. Such remaining packets are trapped and cannot be further processed by the host since the connection and the corresponding state information have been offloaded to the offload engine.

A conventional method for dealing with the trapped frames is to drop them and to request retransmission. However, such a method can be time and resource intensive and can severely penalize a connection for a long period of time, especially if some of the first packets dropped are from a newly established connection.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found in, for example, systems and methods that handle frames in multiple stack environments. In one embodiment, the present invention may provide a system that handles frames in a multiple stack environment. The system may include, for example, a non-offload protocol stack and an offload protocol stack, the offload protocol stack being coupled to the non-offload protocol stack. The non-offload protocol stack may include, for example, one or more partially processed frames. The one or more partially processed frames may be sent to the offload protocol stack to complete processing in the offload protocol stack.

In another embodiment, the present invention may provide a system that handles frames in a multiple stack environment. The system may include, for example, a host and an offload engine. The host may run a software portion of a non-offload protocol stack. The offload engine may be coupled to the host and may include, for example, a hardware portion of an offload protocol stack. The non-offload protocol stack may include, for example, one or more partially processed frames. The one or more partially processed frames may be sent from the host to the offload engine to complete processing in the offload protocol stack.

In another embodiment, the present invention may provide a system that handles frames in a multiple stack environment. The system may include, for example, a first layered processing system and a second layered processing system, the second layered processing system being coupled to the first layered processing system. Frames of a particular connection in the first layered processing system may be moved to the second layered processing system.

In yet another embodiment, the present invention may provide a method that handles frames in a multiple stack environment. The method may include one or more of the following: completing an offload of a connection from a non-offload protocol stack to an offload protocol stack; and sending a partially processed frame remaining in the non-offload protocol stack to the offload protocol stack to complete processing of the partially processed frame.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
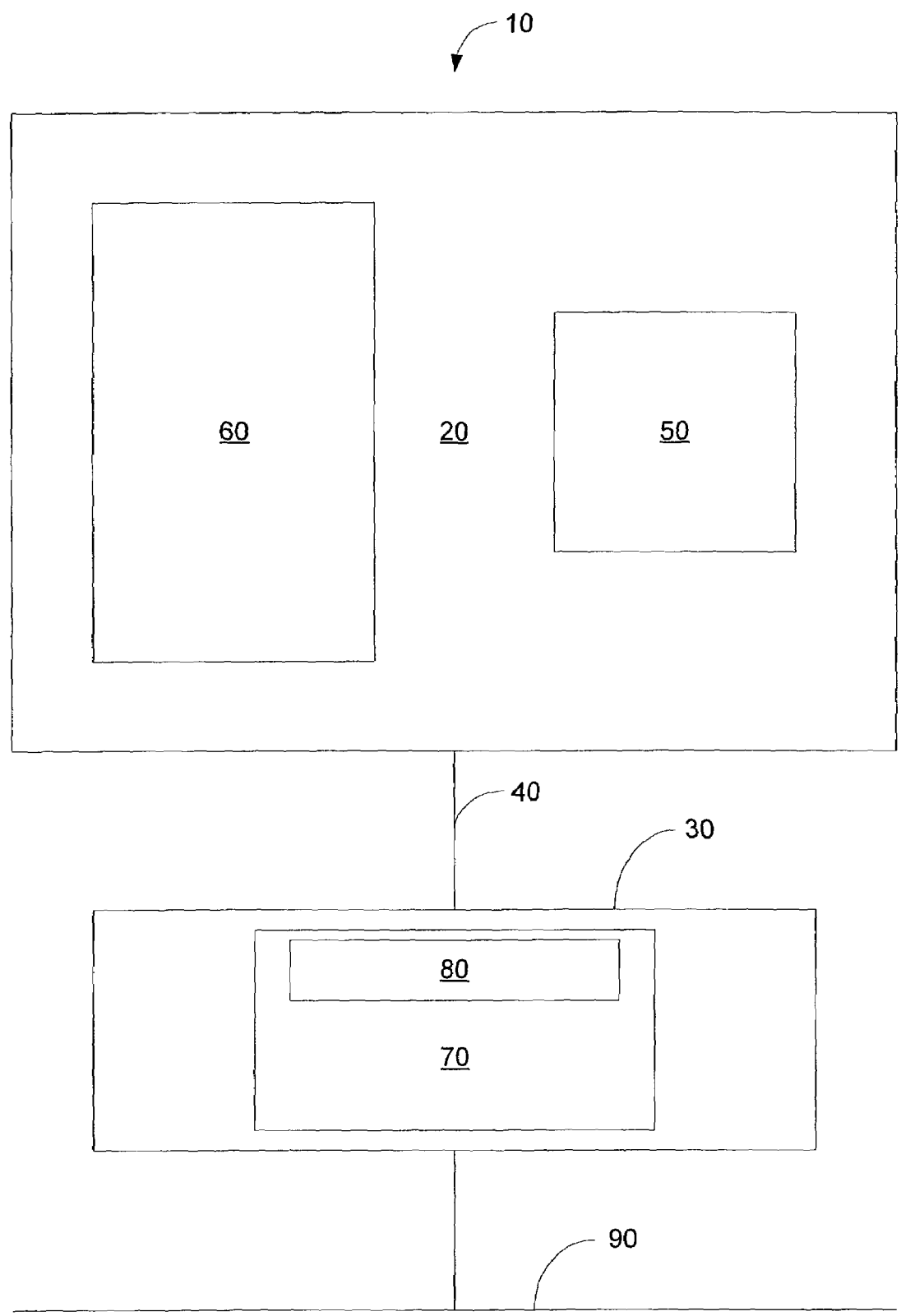
FIG. 1 shows a block diagram illustrating an embodiment of a system that handles frames in a multiple stack environment according to the present invention.

FIG. 1 shows a block diagram illustrating an embodiment of a system that handles frames in a multiple stack environment according to the present invention. Herein, frames, packets and segments may be used interchangeably. The system 10 may include, for example, a host 20, a network interface card (NIC) 30 and a host interface 40. The host 20 may include, for example, a host processor 50 (e.g., a central processing unit (CPU)) and a host memory 60. The host interface 40 may be, for example, a peripheral component interconnect (PCI), a direct memory access (DMA) interface or some other type of interface. The NIC 30 may include, for example, an offload engine 70. The offload engine 70 may be, for example, a transmission control protocol/internet protocol (TCP/IP) offload engine (TOE). The NIC 30 may include, for example, a DMA engine 80. In one embodiment, the offload engine 70 may include, for example, the DMA engine 80. The host 20 may be coupled to the NIC 30 via the host interface 40. The NIC 30 may be coupled to a physical communications medium 90 such as, for example, an Ethernet. The present invention also contemplates integrating or separating the illustrated components of the system 10. For example, the NIC 30 and the offload engine 70 may be integrated into a single integrated chip that may, for example, be mounted on a host motherboard. In another example, the DMA engine 80 may be a part of the NIC 30, but may be a separate component from the offload engine 70. The present invention also contemplates components that may not be illustrated. For example, the offload engine 70 may be coupled to a dedicated memory on the NIC 30 or may include memory within the offload engine 70. In another example, the host 20 may also access the physical communications medium 90 via other NICs, adapters or controllers.

Figure 2A:
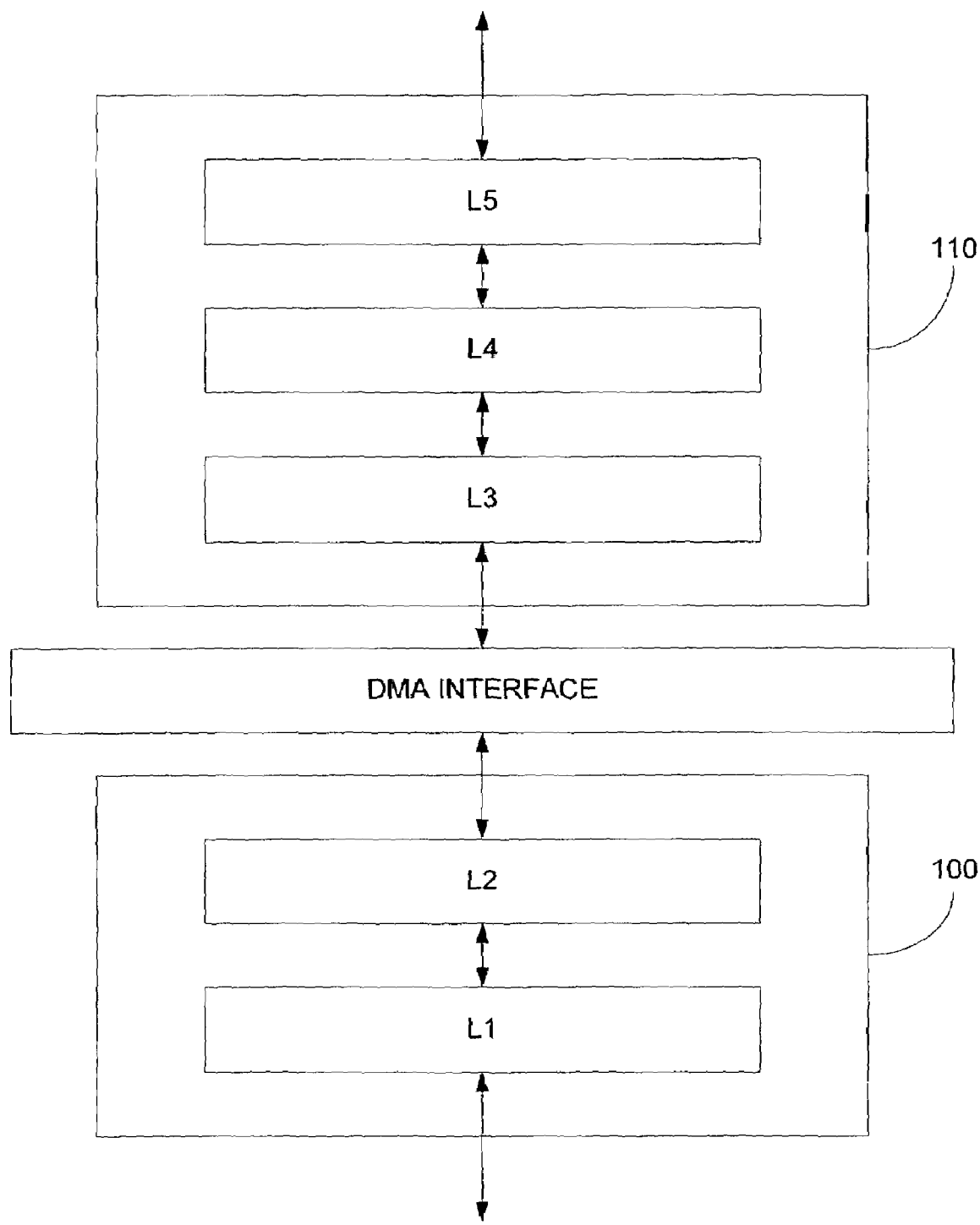
FIGS. 2A-B show block flow diagrams illustrating embodiments of protocol stacks according to the present invention.
Figure 2B:
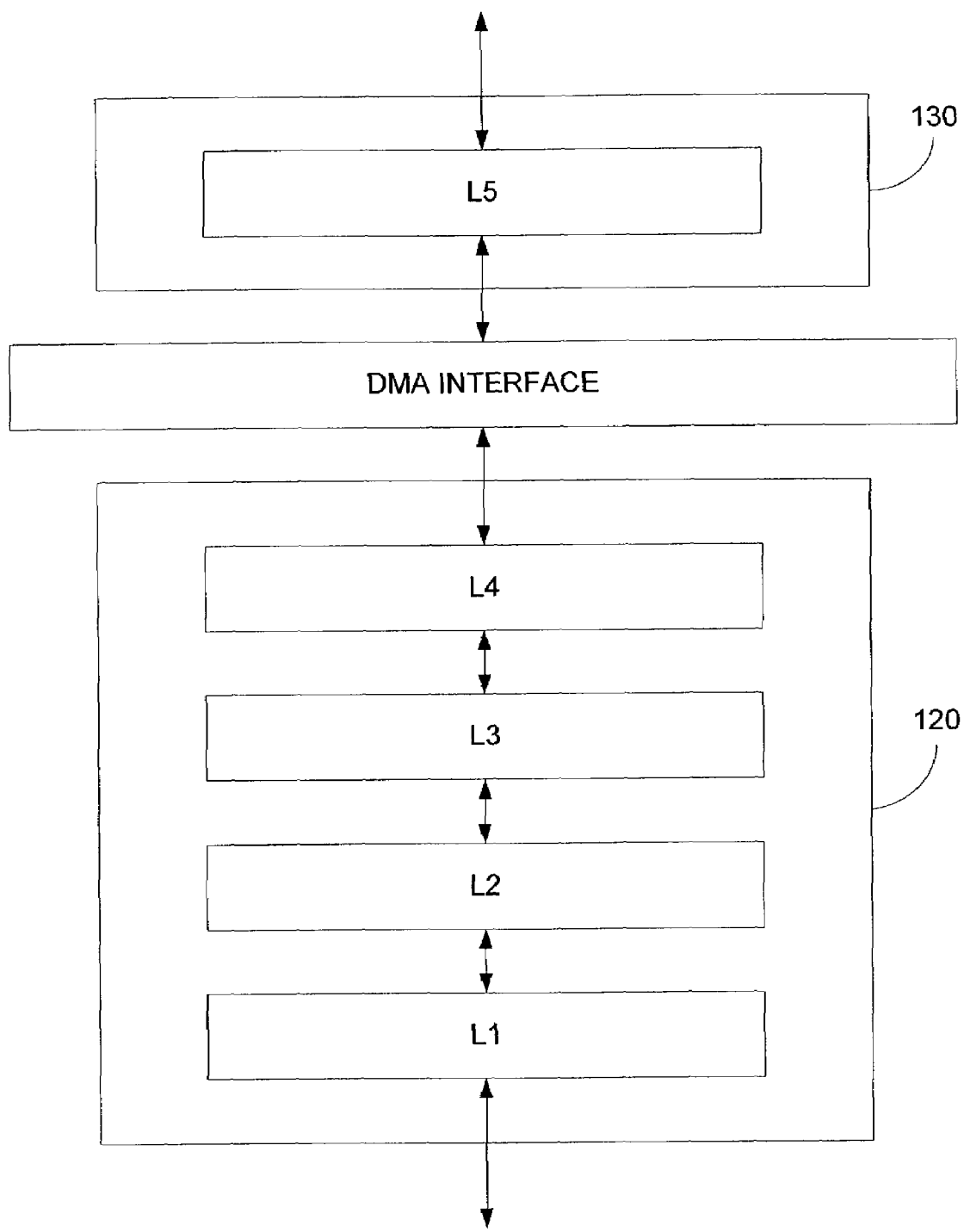

FIGS. 2A and 2B show block flow diagrams illustrating embodiments of protocol stacks according to the present invention. FIG. 2A shows a block flow diagram illustrating an embodiment of a protocol stack used when a particular connection is not offloaded from the host 20 to the offload engine 70 according to the present invention. The non-offload protocol stack may include, for example, non-offload layers of protocol in hardware 100, a DMA interface 40 and non-offload layers of protocol in software 110. The non-offload layers of protocol in hardware 100 may include, for example, L1 and L2 processing layers. The non-offload layers of protocol in software 110 may include, for example, L3, L4, L5 or higher processing layers. In operation, packets may arrive via, for example, a network connection and may be processed by the non-offload layers of protocol in hardware 100 before being sent to the non-offload layers of protocol in software 110 via the DMA interface 40. The packets are then processed by the non-offload layers of protocol in software 110.

Figure 3:
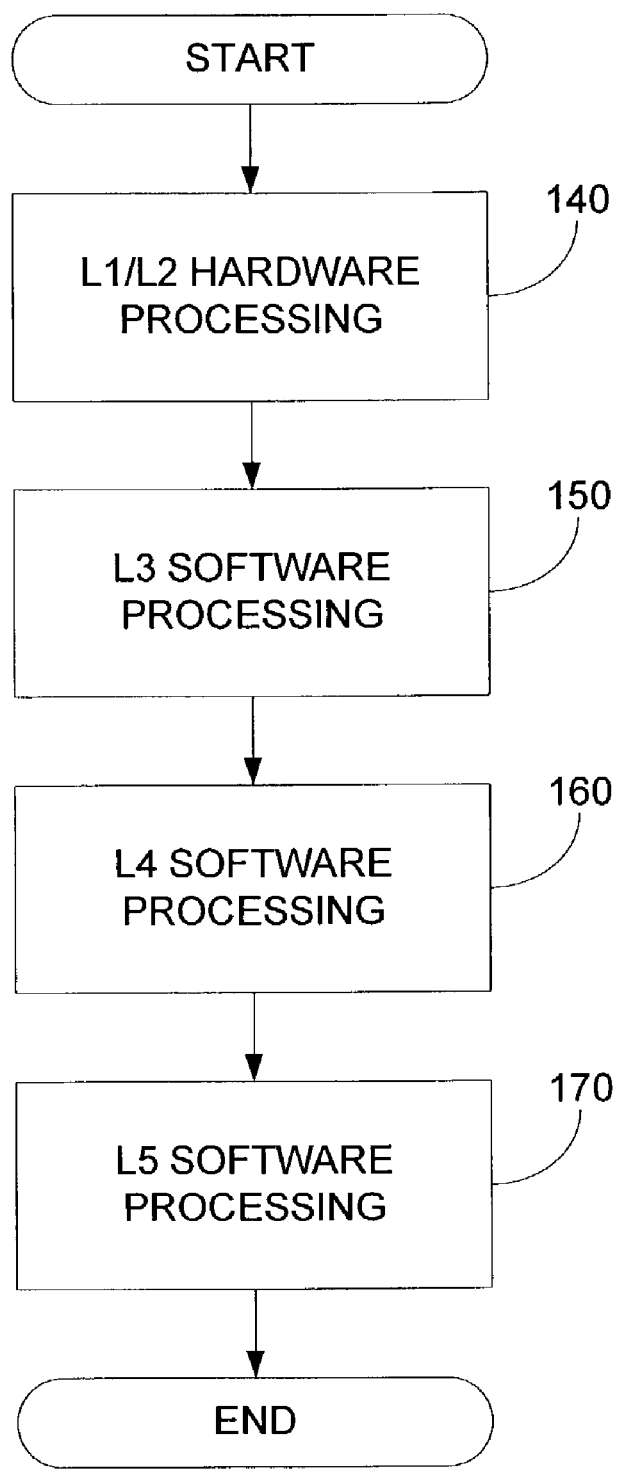
FIG. 3 shows a flow chart illustrating an embodiment of a process that processes incoming packets that have not been offloaded according to the present invention.

FIG. 3 shows a flow chart illustrating an embodiment of a process that processes incoming packets that have not been offloaded according to the present invention. In step 140, L1/L2 hardware may process the incoming frames. The L1/L2 hardware may be part of the non-offload layers of protocol in hardware 100. The frames may be carried on the physical communications medium 90 such as, for example, the Ethernet. The frames may be processed, for example, in an Ethernet adapter that may be part of the NIC 30. The Ethernet adapter may also be integrated, at least in part, with the offload engine 70. The L1/L2 processed frames may be passed from the NIC 30 to the host 20 via the host interface 40 (e.g., the DMA interface, PCI, etc.) The host 20 may use the host processor 50 and the host memory 60 to process the frames further. In steps 150-170, L3/L4/L5 or higher processing may occur in respective layers of the non-offload layers of protocol in software 110 via software run by the host processor 50.

FIG. 2B shows a block flow diagram illustrating an embodiment of a protocol stack used when a particular connection is offloaded from the host 20 to the offload engine 70 according to the present invention. The offload layers of protocol may include, for example, offload layers of protocol in hardware 120, the DMA interface 40 and offload layers of protocol in software 130. The offload layers of protocol in hardware 120 may include, for example, L1, L2, L3 and L4 processing layers. The offload layers of protocol in software 130 may include, for example, L5 or higher processing layers.

Figure 4:
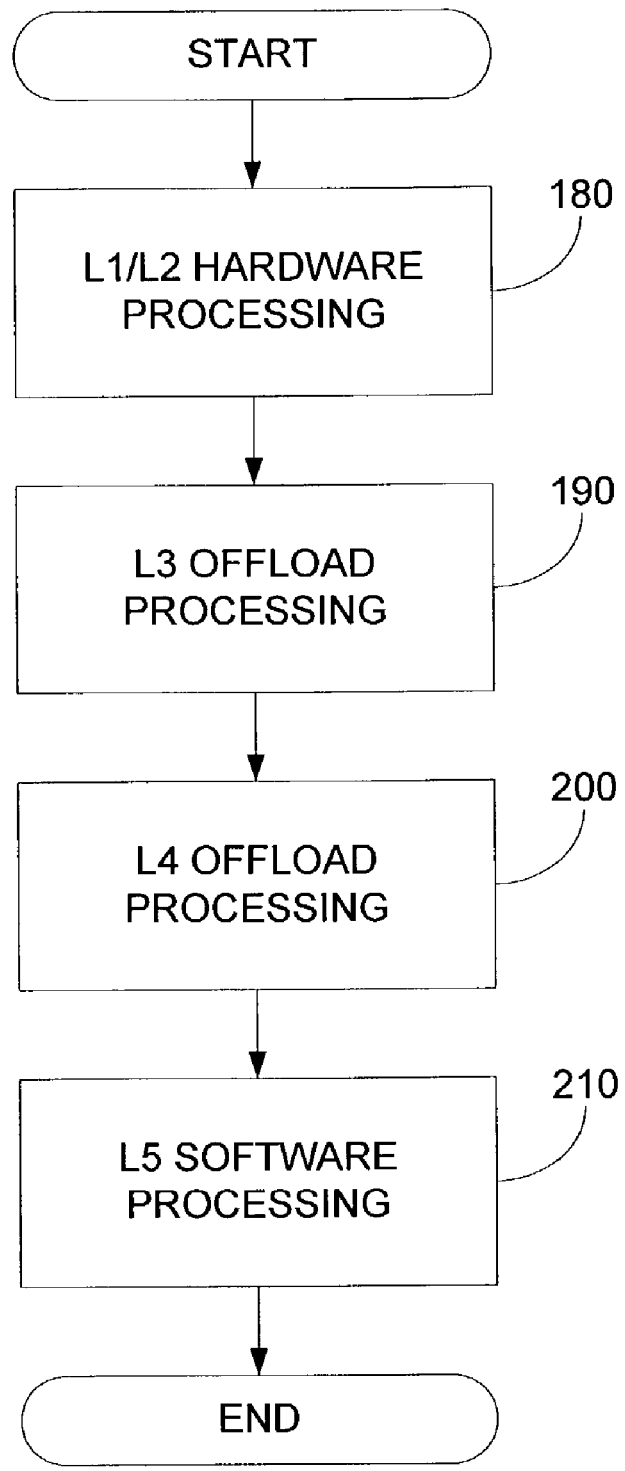
FIG. 4 shows a flow chart illustrating an embodiment of a process that processes incoming packets that have been offloaded according to the present invention.

FIG. 4 shows a flow chart illustrating an embodiment of a process that processes incoming packets that have been offloaded according to the present invention. In step 180, L1/L2 hardware may process the incoming frames. The L1/L2 hardware may be part of the offload layers of protocol in hardware 120. The frames may be carried on the physical communications medium 90 such as, for example, the Ethernet. The frames may be processed, for example, in an Ethernet adapter that may be part of the NIC 30. The Ethernet adapter may also be integrated, at least in part, with the offload engine 70. In steps 190-200, the frames are L3/L4 offload processed in respective offload layers of protocol in hardware 120. In one embodiment, the offload engine 70 of the NIC 30 may include, for example, hardware for L3/L4 processing. The offload engine 70 may provide accelerated processing. In another embodiment, the offload engine 70 may include, for example, the hardware for L1/L2/L3/L4 processing. After the L4 processing, the frames are sent to the host 20 via the host interface 40 (e.g., the DMA interface, PCI, etc.) The host 20 may use the host processor 50 and the host memory 60 to process the frames further. In step 210, L5 or higher processing may occur via software run by the host processor 50. In one embodiment, the offload layers of protocol in software 130 are used to further process the frames.

The offload protocol stack and the non-offload protocol stack may share processing layers for streams of packets. For example, L1 and L2 processing layers of respective hardware portions of the protocol stacks may be commonly used by both the offload protocol stack and the non-offload protocol stack. In addition, the L5 or higher processing layers of respective software portions of the protocol stacks may be commonly used by both the offload protocol stack and the non-offload protocol stack. In another example, the offload protocol stack and the non-offload stack may share the host interface 40 (e.g., the DMA interface) and may communicate with each other via the host interface 40. In one embodiment, after a particular connection has been offloaded from the non-offload protocol stack to the offload protocol stack, partially processed packets in the non-offload protocol stack may be sent to corresponding layers in the offload protocol stack via the DMA interface 40 or some other interface. The offload protocol stack may then complete processing on the partially processed packets.

Figure 5:
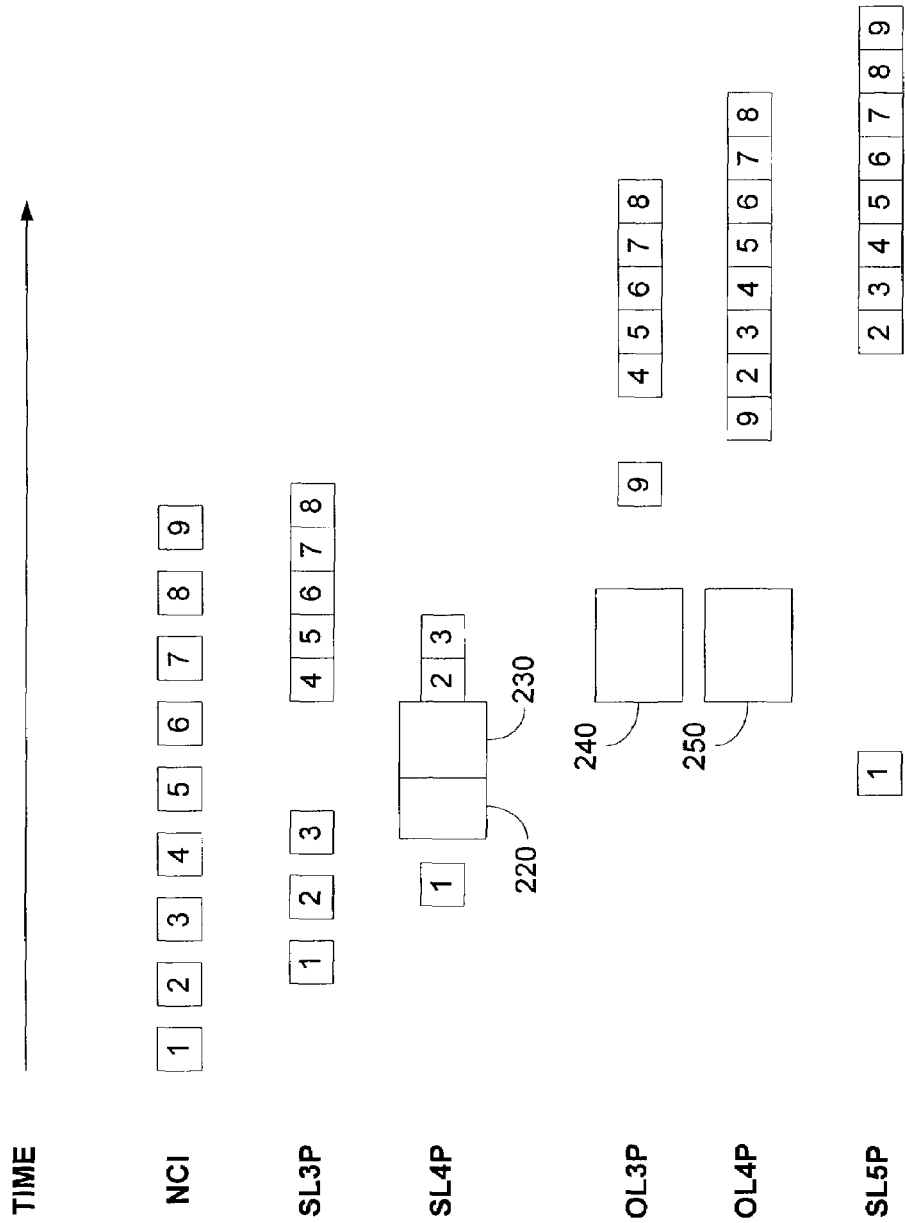
FIG. 5 is a time representation of an embodiment of a system and method that handles frames in a multiple stack environment according to the present invention.

FIG. 5 is a time representation of an embodiment of a system and method that process partially processed frames according to the present invention. FIG. 5 illustrates an example in which frames 1-9 progress in time with respect to the network controller input (NCI), software L3 processing (SL3P), software L4 processing (SL4P), offload L3 processing (OL3P), offload L4 processing (OL4P) and software L5 processing (SL5P). The time line is not necessarily to scale (e.g., linear scale). Furthermore, the relative times between various layers may not necessarily be to scale. When it is decided, for example, by the software stack that a connection is to be offloaded, the offload protocol stack is notified of the decision to offload the connection 220 which may be processed by the SL4P. The SL4P then synchronizes with the SL3P and begins to collect software processing state information 230 including, for example, connection state information. It takes time 240, 250 for the OL3P and OL4P of the offload engine 70 to receive and to process state variables including, for example, connection state variables and to prepare to process new incoming frames.

Frame 1 is an example of frame processing before the decision to offload the connection has been made according to the present invention. The frame 1 is received by the NCI. The network controller, for example, may provide the hardware for L1/L2 processing. The frame 1 may then be sent (e.g., via the host interface 40) to the software stack for further processing. L3, L4 and L5 processing may occur in SL3P, SL4P and SL5P, respectively, of the non-offload protocol stack.

Frames 2 and 3 are examples of frames that were only partially processed, having completed L3 processing, but not L4 processing, in the software stack according to the present invention. The frames 2 and 3 are received by the NCI. The network controller, for example, may provide the hardware for L1/L2 processing. The frames 2 and 3 complete L3 processing in the SL3P before the state information is completely collected 230. The frames 2 and 3 are sent to SL4P, however, the frames 2 and 3 are not processed since the state information is not available in the software stack. The frames 2 and 3 are transferred via the host interface 40 (e.g., a DMA interface) to the offload engine 70 to OL4P where they are L4 processed. The frames 2 and 3 can be L4 processed even if received out of order by OL4P. The frames 2 and 3 are then sent to SL5P such that SL5P receives frames in order. Since the frame 1 was already received by SL5P, frames 2 and 3 can be sent to SL5P. L5 or higher processing of the frames 2 and 3 may be performed by SL5P or higher processing layers.

Frames 4-8 are examples of frames that were only partially processed, having completed L1/L2 processing, but not L3 processing. The frames 4-8 are received by the NCI. The network controller, for example, may provide the hardware for L1/L2 processing. Upon completing L1/L2 processing, the frames 4-8 are sent to SL3P. However, the frames 4-8 are not processed since the state information is not available in the software stack after the state information is successfully collected 230. The frames 4-8 are transferred via the host interface 40 (e.g., a DMA interface) to the offload engine 70 to OL3P where they are L3 processed. The frames 4-8 can be L3 processed even if received out of order by the OL3P. The frames 4-8 are then sent to OL4P where they are L4 processed. The frames 4-8 can be L4 processed even if received out of order by OL4P. The frames 4-8 are then sent to SL5P such that SL5P receives frames in order. Since the frames 1-3 were already received by SL5P, frames 4-8 can be sent to SL5P using, for example, the host interface 40 (e.g., a DMA interface). L5 or higher processing of the frames 48 may be performed by SL5P or higher processing layers.

Frame 9 is an example of frame processing after the connection has been offloaded to the offload engine 70 according to the present invention. Frame 9 is received by the NCI. The network controller, for example, may provide the hardware for L1/L2 processing. Frame 9 may then be sent to the offload engine 70 for further processing. L3 and L4 processing may occur in OL3P and OL4P, respectively. OL3P and OL4P may process frames out of order. Thus, the frame 9 may be L3 processed by OL3P before frames 4-8 are processed by OL3P. Furthermore, the frame 9 may be L4 processed by OL4P before frames 2-8 are processed by OL4P. However, in one embodiment, OL4P sends frames to SL5P in order. Thus, the delivery of the frame 9 is postponed until the frames 2-8 are sent to SL5P. L5 or higher processing of the frame 9 may be performed by SL5P or higher processing layers.

Although illustrated in one embodiment as a system that provides SL5P with in-order frames, the present invention is not so limited in scope. In one embodiment, SL5P may, for example, be adapted such that SLP5 may receive and process frames out of order. In another embodiment, a lower processing layer or a higher processing layer (e.g., SLP6) may have a requirement of receiving or processing frames in order. In yet another embodiment, layers may receive and process out-of-order frames until or including the application layer. In another embodiment, a lower processing layer or a higher processing layer may receive or process frames out of order. In addition, although illustrated in one embodiment as a system in which each of the multiple stacks had the same layer location of an in-order requirement (i.e., L5 in both stacks received frames in order), the present invention need not be so limited. Thus, different stacks in the multiple stack system may have different layer levels in which the frames are sent to the next layer in order.

Figure 6:
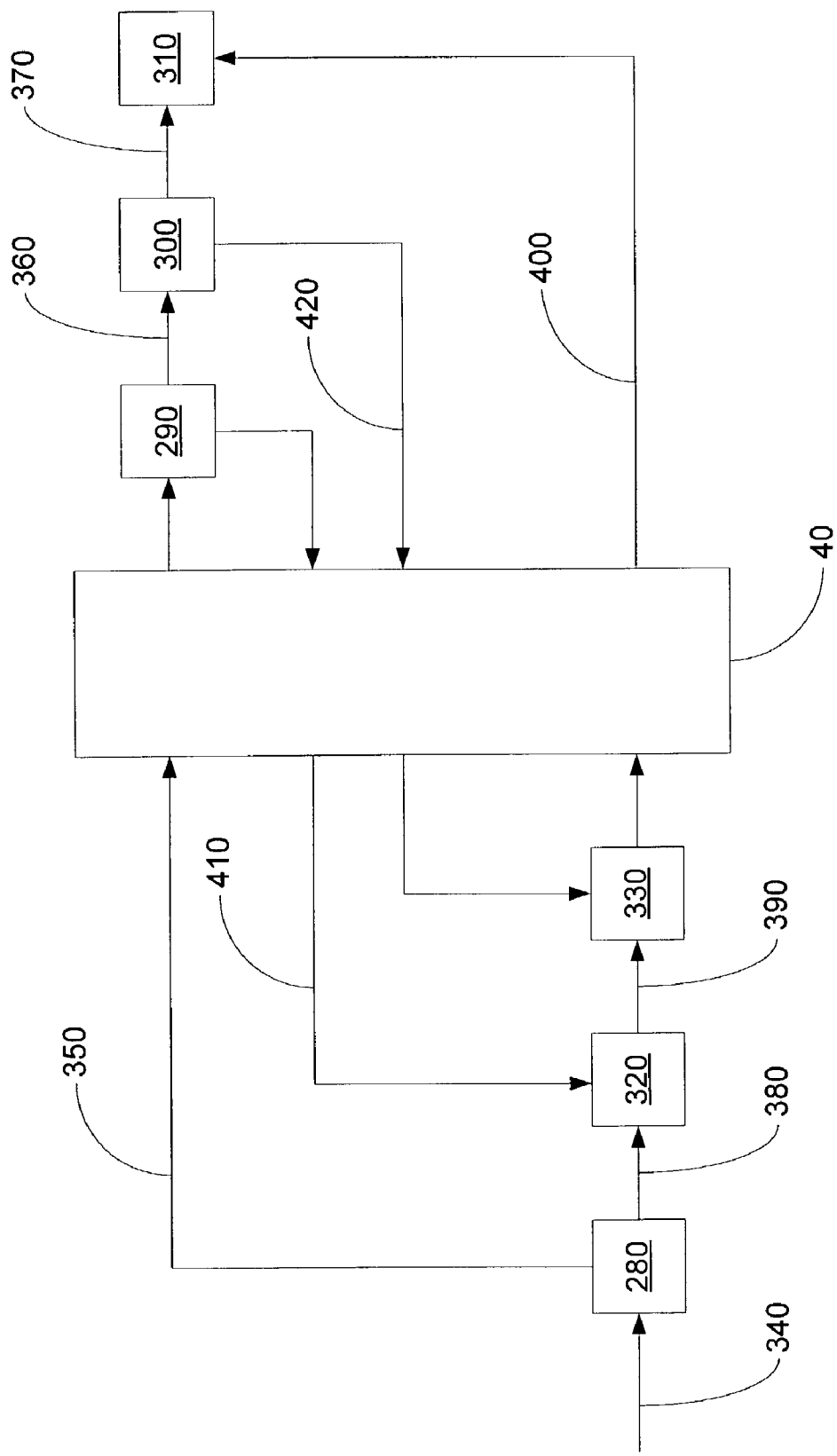
FIG. 6 shows a block flow diagram illustrating an embodiment of a system that handles frames in a multiple stack environment according to the present invention.

FIG. 6 shows a block representation illustrating an embodiment of a system that handles frames in a multiple stack environment according to the present invention. Frames may be received and processed by an L1/L2 hardware processing block 280 via a network input 340. If a decision to offload the connection has not been made, then the L1/L2 processed frame is sent to the L3 software processing block 290 via path 350 through the host interface 40 (e.g., a DMA interface, PCI, etc.) After L3 software processing, the frame is sent to L4 software processing block 300 via path 360. The frame is then sent to L5 software processing block 310 via path 370. After L5 processing of the frame, the frame may be passed on to other processing blocks that may provide higher layer or other processing.

If a connection has already been completely offloaded to the offload engine 70, then a frame is received by and processed by the L1/L2 hardware processing block 280 via the network input 340. After L1/L2 processing, the frame is sent to L3 offload processing block 320 via path 380. After L3 processing, the frame is sent to L4 offload processing block 330 via path 390. After L4 processing, the frame is sent to the L5 software processing block 310 via the host interface 40 and path 400. In one embodiment, the L5 software processing block 310 receives frames in order. Thus, the L4 offload processing block 330 may postpone the delivery of frames to the L5 software processing block 310 until the frames can be delivered in order. After L5 processing of the frame, the frame may be passed on to other processing blocks that may provide higher layer or other processing.

Figure 7:
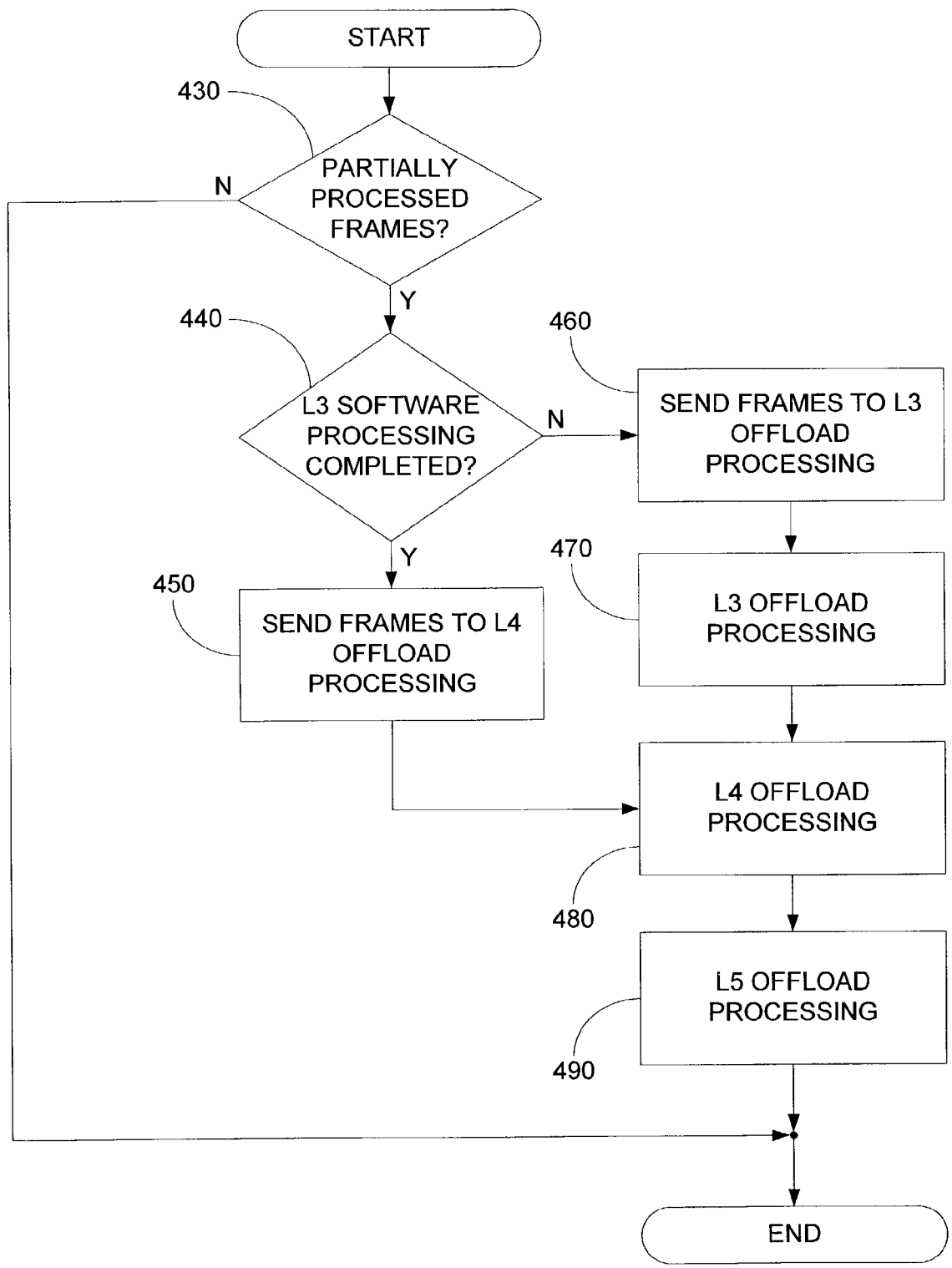
FIG. 7 shows a flow chart illustrating an embodiment of a process that processes partially processed frames according to the present invention.

During a transition period in which a connection is being offloaded from the non-offload protocol stack to the offload protocol stack, some packets may remain in the non-offload protocol stack. The remaining packets in the non-offload protocol stack may not have had their processing completed since, for example, state information was collected and sent to the offload protocol stack. FIG. 7 shows a flow chart illustrating an embodiment of a process that handles partially processed frames according to the present invention. In query 430, it is determined whether partially processed packets are present in the non-offload protocol stack. If partially processed packets are not present in the non-offload protocol stack, then the process is complete. If partially processed packets are present in the non-offload protocol stack, then, in query 440, it is determined whether L3 software processing has been completed.

One or more frames of the frames remaining in the non-offload protocol stack may have completed L1/L2 processing and may have been sent to the L3 software processing block 290 via the path 350 and the host interface 40. However, without state information, the L3 software processing block 290 cannot further process the one or more frames. Since L3 software processing was not completed, in step 460, the one or more frames are sent to the L3 offload processing block 320 via a catch-up interface 410. The catch-up interface 410 may use, for example, a dedicated path, the host interface 40 or another type of interface. In step 470, the L3 offload processing block 320 processes the frames received via the catch-up interface 410. In step 480, the L4 offload processing block 330 receives frames from the L3 offload processing block 320 and processes the frames. In one embodiment, the L3 offload processing block 320 and the L4 offload processing block 330 are adapted to process out-of-order frames. In step 490, the frames are sent to the L5 software processing block 310 via the host interface 40 and the path 400. In one embodiment, the L5 software processing block 310 receives the frames in order from the L4 offload processing block 330. The L4 offload processing block 330 may be adapted to deliver the frames in order, even if the L4 offload processing block 330 receives or processes the frames out of order. After L5 processing of the frame, the frame may be passed on to other processing blocks that may provide higher layer or other processing.

One or more frames of the frames remaining in the non-offload protocol stack may have completed L3 software processing and may have been sent to the L4 software processing block 300 via the path 360. However, without state information, the L4 software processing block 300 cannot further process the one or more frames. Since L3 software processing was completed, in step 450, the one or more frames are sent to the L4 offload processing block 330 via a catch-up interface 420. The catch-up interface 420 may use, for example, a dedicated path, the host interface 40 or some other type of interface. The process then continues on to steps 480 and 490 as described above. Although illustrated as an embodiment of a system including catch-up interfaces at L3 and L4 the present invention need not be so limited. The present invention also contemplates catch-up interfaces at other layer levels in addition to or instead of the catch-up interfaces at L3 and L4.

Although the flow charts described herein illustrate embodiments showing a particular order of steps or queries, the present invention is not so limited in scope. Thus, the steps or queries may be rearranged in order and steps or queries may be added or removed. Furthermore, one or more steps or queries may be performed in parallel or concurrently.

Although one embodiment of a multiple stack system showed a first stack being a non-offload stack and a second stack being an offload stack, the present invention need not be so limited. For example, in one embodiment, two of the stacks may be both offload stacks or two of the stacks may be both non-offload stacks. Connections may thus be moved from an offload stack to another offload stack or from a non-offload stack to another non-offload stack. In addition, although one embodiment of the multiple stack system showed a dual stack system, the present invention also contemplates that the multiple stack system may include more than two stacks. Thus, in one embodiment, the multiple stack system may include, for example, two offload stacks and one non-offload stack in which connections can be moved between the three stacks. Furthermore, the decision to move a particular connection from one stack to another stack can be made, for example, on a per connection basis, a per stack basis, per host basis or according to other criteria and factors.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for processing incoming frames in a multiple stack environment, the system comprising:
   a non-offload protocol stack adapted to process at least a first connection protocol layer for incoming frames received from a network interface card; and
   an offload protocol stack coupled to the non-offload protocol stack and adapted to process at least the first connection protocol layer for the incoming frames, at least a portion of the offload protocol stack implemented in hardware,
   wherein, prior to offloading, the first connection protocol layer of the non-offload protocol stack comprises one or more partially processed incoming frames, and
   wherein, during offloading, the one or more partially processed incoming frames are sent from the first connection protocol layer of the non-offload protocol stack to the first connection protocol layer of the offload protocol stack, via a first catch-up interface dedicated exclusively to the first connection protocol layer, to complete processing in the offload protocol stack.

2. The system according to claim 1,
   wherein the one or more partially processed incoming frames comprise a set of incoming frames that has completed processing in accordance with a second connection protocol layer, but not processing in accordance with the first connection protocol layer, in the non-offload protocol stack, and
   wherein the set of incoming frames is sent to the first connection protocol layer of the offload protocol stack for processing in accordance with the first connection protocol layer.

3. The system according to claim 2,
   wherein the first connection protocol layer corresponds to L3 processing, and
   wherein the second connection protocol layer corresponds to L2 processing.

4. The system according to claim 3, wherein the first catch-up interface dedicated exclusively to the first connection protocol layer communicates the sent partially processed incoming frames from the first connection protocol layer of the non-offload protocol stack to the first connection protocol layer of the offload protocol stack without passing through other protocol layers of the non-offload and offload protocol stacks.

5. The system according to claim 2, wherein:
   the non-offload protocol stack is adapted to process a second connection protocol layer for incoming frames;
   the offload protocol stack is adapted to process the second connection protocol layer for incoming frames; and
   prior to offloading, the second connection protocol layer of the non-offload protocol stack comprises one or more partially processed incoming frames that, during offloading, are sent from the second connection protocol layer of the non-offload protocol stack to the second connection protocol layer of the offload protocol stack via a second catch-up interface dedicated exclusively to the second connection protocol layer.

6. The system according to claim 5,
wherein the first connection protocol layer corresponds to L4 processing, and
wherein the second connection protocol layer corresponds to L3 processing.

7. The system according to claim 2, wherein the first catch-up interface passes through a host interface.

8. The system according to claim 1,
wherein the non-offload protocol stack comprises a layer that provides a first level of processing and a layer that provides a second level of processing, and
wherein the layer that provides the first level of processing of the non-offload stack sends frames in order to the layer that provides the second level of processing of the non-offload stack.

9. The system according to claim 8,
wherein the first level of processing comprises L4 processing; and
wherein the second level of processing comprises L5 processing.

10. The system according to claim 8, wherein the layer that provides the first level of processing of the non-offload stack postpones delivery of a particular frame that is out of order.

11. The system according to claim 1,
wherein the offload protocol stack comprises a layer that provides a first level of processing and a layer that provides a second level of processing, and
wherein the layer that provides the first level of processing of the offload stack sends frames in order to the layer that provides the second level of processing to the non-offload stack.

12. The system according to claim 1,
wherein the offload protocol stack comprises a layer that provides a first level of processing,
wherein the non-offload protocol stack comprises a layer that provides a higher level of processing than the first level, and
wherein the layer that provides the first level of processing of the offload stack sends frames in order to the layer that provides the higher level of processing of the non-offload stack.

13. The system according to claim 1,
wherein the offload protocol stack comprises a layer that provides a first level of processing,
wherein the non-offload protocol stack comprises a layer that provides a higher level of processing than the first level, and
wherein the layer that provides the first level of processing of the offload stack sends out-of-order frames to the layer that provides the higher level of processing of the non-offload stack.

14. The system according to claim 1, wherein frames are processed or received out of order in the non-offload stack or the offload stack until an application layer of the respective stack.

15. A system for processing incoming frames in a multiple stack environment, comprising:
a host that runs a software portion of a non-offload protocol stack, the software portion adapted to process at least a first connection protocol layer for incoming frames received from a network interface card; and
an offload engine coupled to the host and comprising a hardware portion of an offload protocol stack, the hardware portion adapted to process at least the first connection protocol layer for the incoming frames;
wherein, prior to offloading, the first connection protocol layer of the non-offload protocol stack comprises one or more partially processed incoming frames for processing in accordance with the first connection protocol layer, and
wherein, during offloading, the one or more partially processed incoming frames are sent from the first connection protocol layer of the host to the first connection protocol layer of the offload engine, via a first catch-up interface dedicated exclusively to the first connection protocol layer, for processing in accordance with the first connection protocol layer.

16. The system according to claim 15, wherein the one or more partially processed incoming frames are sent from the software portion of the non-offload protocol stack to the hardware portion of the offload protocol stack.

17. The system according to claim 15, wherein at least one partially processed incoming frame in a first level, software processing block of the non-offload protocol stack is sent to a first level, hardware processing block of the offload protocol stack.

18. The system according to claim 17,
wherein the first level, software processing block comprises a software L3 processing block, and
wherein the first level, hardware processing block comprises a hardware L3 processing block.

19. The system according to claim 17,
wherein the first level, software processing block comprises a software L4 processing block, and
wherein the first level, hardware processing block comprises a hardware L4 processing block.

20. The system according to claim 15, wherein frames are sent in order from a first level, hardware processing block in the offload engine to a second level, software processing block in the host.

21. The system according to claim 20,
wherein the first level, hardware processing block comprises a hardware L4 processing block, and
wherein the second level, software processing block comprises a software L5 processing block.

22. A system for handling frames in a multiple stack environment, comprising:
a first layered processing system comprising a first connection protocol layer; and
a second layered processing system coupled to the first layered processing system, the second layered processing system comprising a first connection protocol layer corresponding to the first connection protocol layer of the first layered processing system, at least a portion of the first connection protocol layer of the second layered processing system implemented in hardware,
wherein incoming frames of a particular connection received from a network interface card awaiting processing in the first connection protocol layer of the first layered processing system are moved to the first connection protocol layer of the second layered processing system via a first catch-up interface dedicated exclusively to the first connection protocol layer.

23. The system according to claim 22, wherein the incoming frames of the particular connection in the first layered processing system are moved to the second layered processing system after the particular connection has been moved from the first layered processing system to the second layered processing system.

24. The system according to claim 22, wherein the incoming frames of the particular connection in the first layered processing system are partially processed by the first connection protocol layer of the first layered processing system prior to being moved to the first connection protocol layer of the second layered processing system.

25. The system according to claim 22, wherein the incoming frames of the particular connection are moved to the second layered processing system to continue layer processing.

26. The system according to claim 22, wherein the incoming frames of the particular connection are trapped in the first layered processing system prior to being moved to the second layered processing system.

27. The system according to claim 22, wherein the particular connection is moved during a life of the particular connection.

28. The system according to claim 22,
wherein the first layered processing system comprises a first offload layered processing system, and
wherein the second layered processing system comprises a second offload layered processing system.

29. The system according to claim 22,
wherein the first layered processing system comprises a first non-offload layered processing system, and
wherein the second layered processing system comprises a second non-offload layered processing system.

30. The system according to claim 22,
wherein the first layered processing system comprises a non-offload layered processing system, and
wherein the second layered processing system comprises an offload layered processing system.

31. The system according to claim 22, wherein the first layered processing system handles a first set of connections and the second layered processing system handles a second set of connections.

32. The system according to claim 31, wherein a decision to move a connection of the first set of connections from the first layered processing system to the second layered processing system is made on a per connection basis.

33. A method for processing incoming frames in a multiple stack environment comprising a non-offload protocol stack adapted to process incoming frames in accordance with a first connection protocol layer and an offload protocol stack adapted to process incoming frames in accordance with the first connection protocol layer, at least a portion of the offload protocol stack implemented in hardware, the method comprising:
completing an offload of a connection from the first connection protocol layer of the non-offload protocol stack to the first connection protocol layer of the offload protocol stack; and
sending a partially processed incoming frame, which was received from a network interface card and partially processed by the first connection protocol layer of the non-offload protocol stack, from the first connection protocol layer of the non-offload protocol stack to the first connection protocol layer of the offload protocol stack, via a first catch-up interface dedicated exclusively to the first connection protocol layer, to complete processing of the partially processed incoming frame by the offload protocol stack in accordance with the first connection protocol layer.

34. The method according to claim 33,
wherein the partially processed incoming frame completed a first level of processing, but not a second level of processing, in the non-offload protocol stack, and
wherein the sending comprises sending the partially processed incoming frame to a second level, hardware processing block of the offload protocol stack.

35. The method according to claim 34,
wherein the first level of processing is L2 processing,
wherein the second level of processing is L3 processing, and
wherein the second level, hardware processing block comprises a hardware L3 processing block.

36. The method according to claim 34,
wherein the first level of processing is L3 processing,
wherein the second level of processing is L4 processing, and
wherein the second level, hardware processing block comprises a hardware L4 processing block.

37. The method according to claim 33, wherein a second level, software processing block of the offload protocol stack receives frames in order from a first level, hardware processing block of the offload protocol stack.

38. The method according to claim 37,
wherein the second level, software processing block comprises a software L5 processing block, and
wherein the first level, hardware processing block comprises a hardware L4 processing block.

39. The method according to claim 37, wherein the second level, software processing block of the offload protocol stack comprises a second level, software processing block of the non-offload protocol stack.

40. The method according to claim 33, where the non-offload protocol stack is adapted to process incoming frames in accordance with a second connection protocol layer, and the offload protocol stack is adapted to process incoming frames in accordance with the second connection protocol layer, the method further comprising:
completing an offload of the connection from the second connection protocol layer of the non-offload protocol stack to the second connection protocol layer of the offload protocol stack; and
sending a second partially processed incoming frame, which was partially processed by the second connection protocol layer of the non-offload protocol stack, from the second connection protocol layer of the non-offload protocol stack to the second connection protocol layer of the offload protocol stack, via a second catch-up interface dedicated exclusively to the second connection protocol layer, to complete processing of the second partially processed incoming frame by the offload protocol stack in accordance with the second connection protocol layer.

41. The method according to claim 33, wherein sending the partially processed incoming frame via the first catch-up interface dedicated exclusively to the first connection protocol layer comprises sending the partially processing incoming frame from the first connection protocol layer of the non-offload protocol stack to the first connection protocol layer of the offload protocol stack without passing through other protocol layers of the non-offload and offload protocol stacks.

42. The method according to claim 41, wherein the first connection protocol layer corresponds to L3 layer processing.

* * * * *